United States Patent [19]
Zandi et al.

[11] Patent Number: 5,731,988
[45] Date of Patent: Mar. 24, 1998

[54] METHOD AND APPARATUS FOR REVERSIBLE COLOR CONVERSION

[75] Inventors: Ahmad Zandi, Cupertino; Edward L. Schwartz, Sunnyvale, both of Calif.

[73] Assignees: Richo Company, Ltd., Tokyo, Japan; Richo Corporation, Menlo Park, Calif.

[21] Appl. No.: 436,662

[22] Filed: May 8, 1995

[51] Int. Cl.⁶ .............................. H03M 7/00; H03M 7/30
[52] U.S. Cl. ....................... 364/526; 348/391; 382/244; 382/167; 358/518
[58] Field of Search ........................... 364/526, 604, 364/731, 736, 745, 715.02, 725; 382/244, 253, 167; 348/391, 395, 577; 358/518, 521, 523; 345/136, 137

[56] References Cited

U.S. PATENT DOCUMENTS

| | | | |
|---|---|---|---|
| 4,510,578 | 4/1985 | Miyaguchi et al. | 364/725 |
| 5,293,258 | 3/1994 | Dattilo | 358/518 |
| 5,343,311 | 8/1994 | Morag et al. | 358/518 |
| 5,416,614 | 5/1995 | Crawford | 345/154 X |

*Primary Examiner*—Emanuel T. Voeltz
*Assistant Examiner*—Edward Pipala
*Attorney, Agent, or Firm*—Blakely, Sokoloff, Taylor & Zafman

[57] ABSTRACT

A method and apparatus for performing color conversion on image data provided as a plurality of vectors representing a datum of the image. The present invention provides a forward transform that performs reversible color conversion on the plurality of vectors, such that the transform is reversible in integer arithmetic with predictable precision.

46 Claims, 10 Drawing Sheets

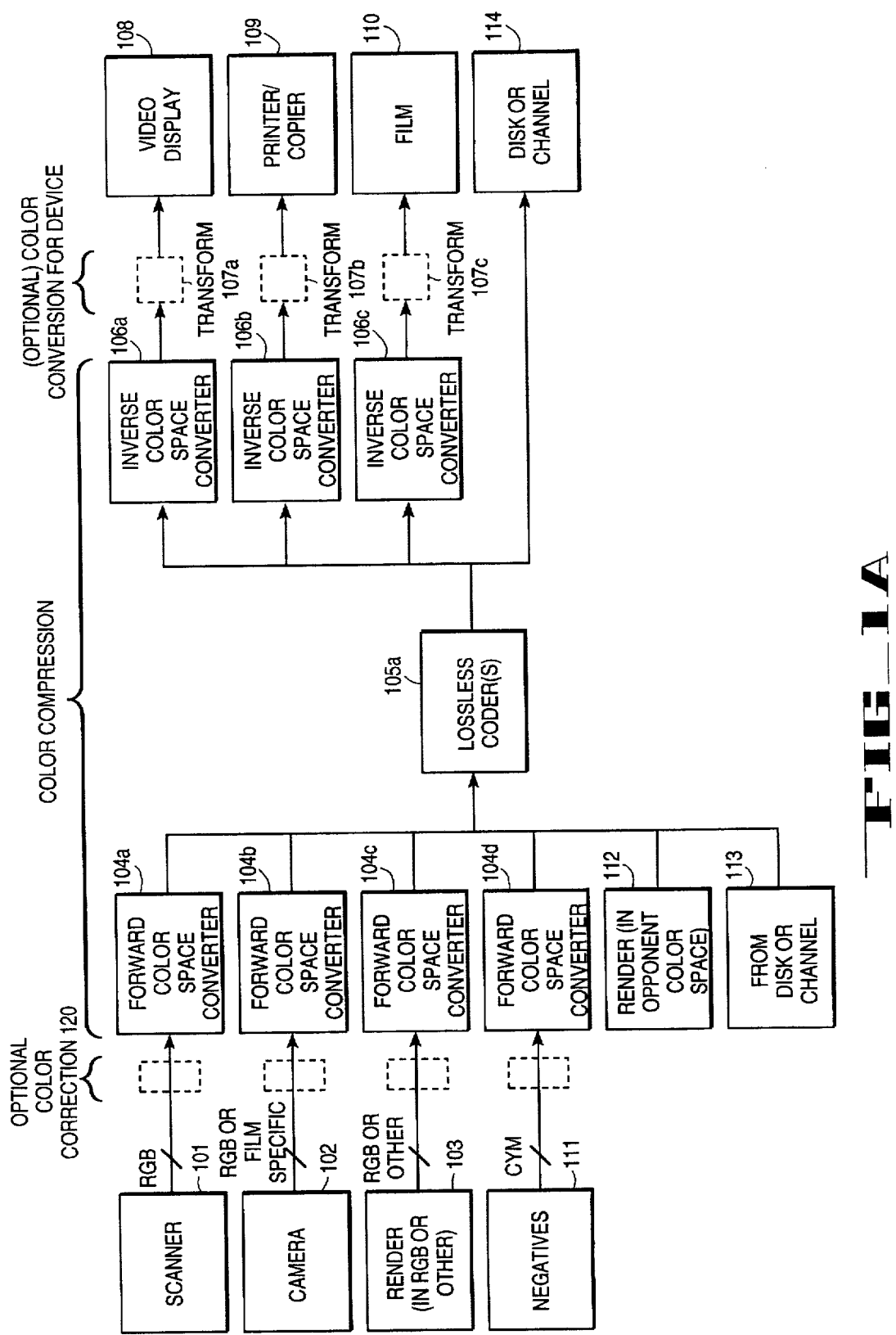
FIG_1A

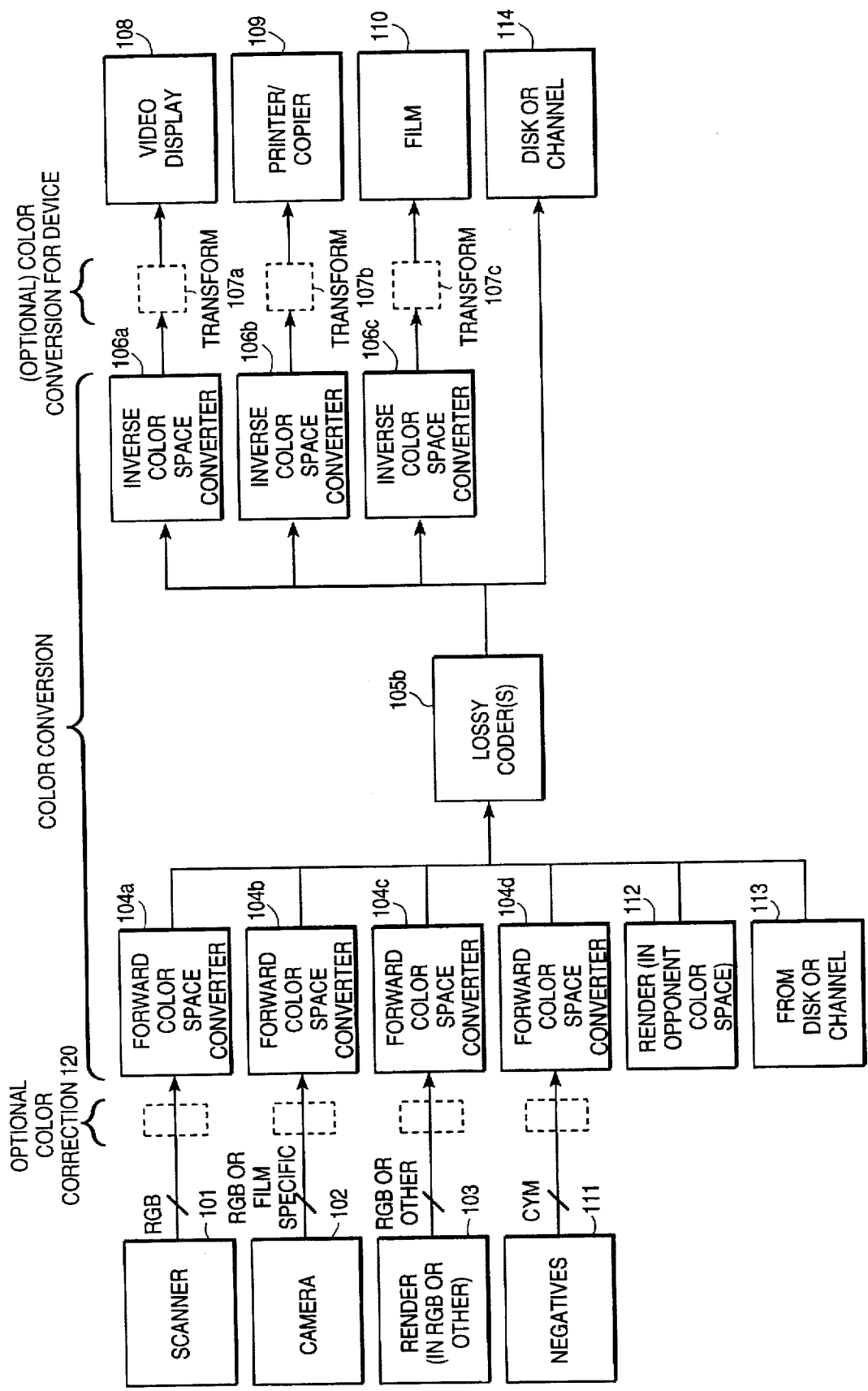
FIG._1B

COLOR DATA → COLOR CONVERSION (FROM COORDINATE 1→2) → COMPRESS → CHANNEL / MEMORY → DECOMPRESS → COLOR CONVERSION (FROM COORDINATE 2→1) → RECONSTRUCTED DATA

FIG. 2

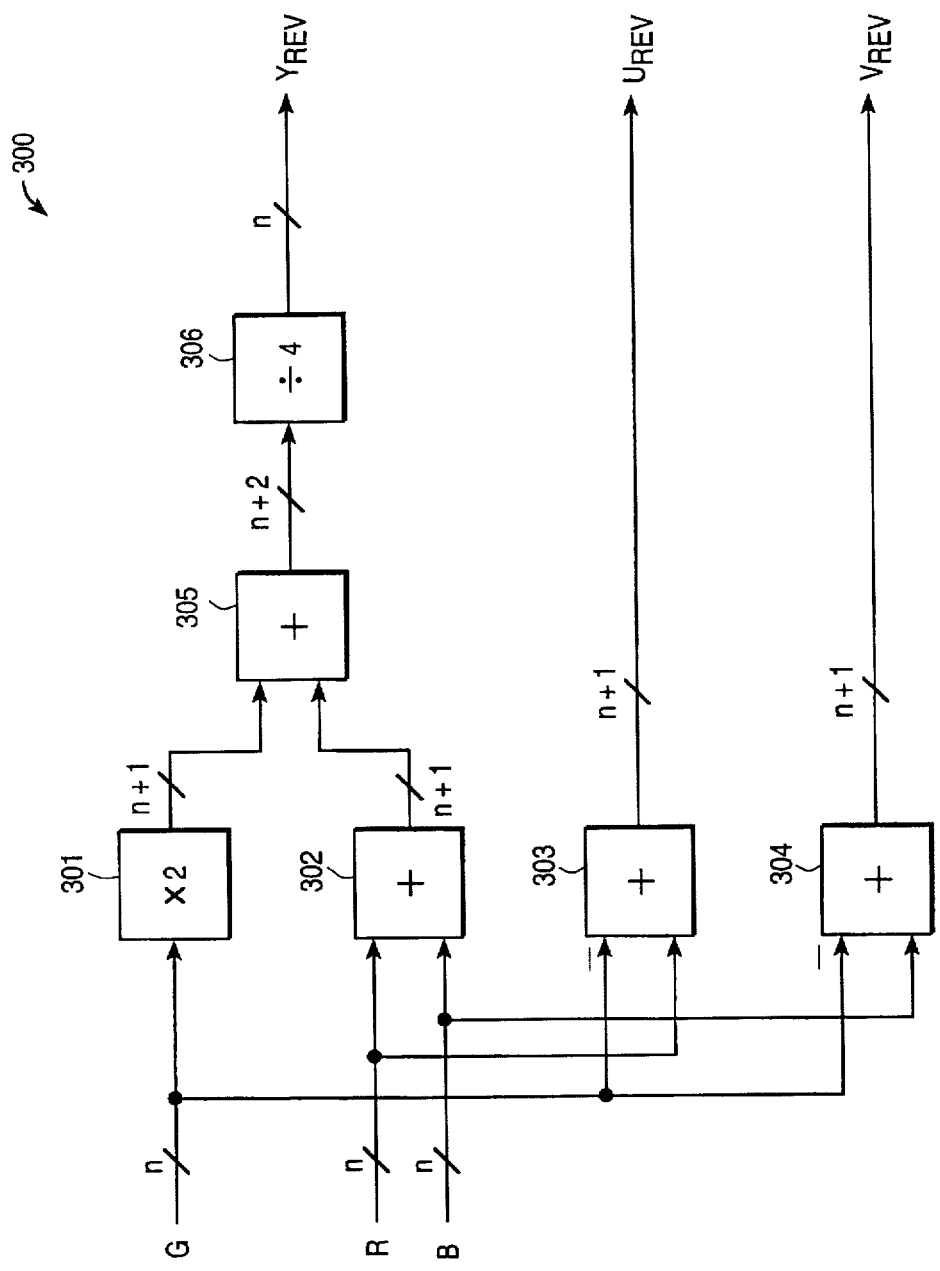
FIG_3A

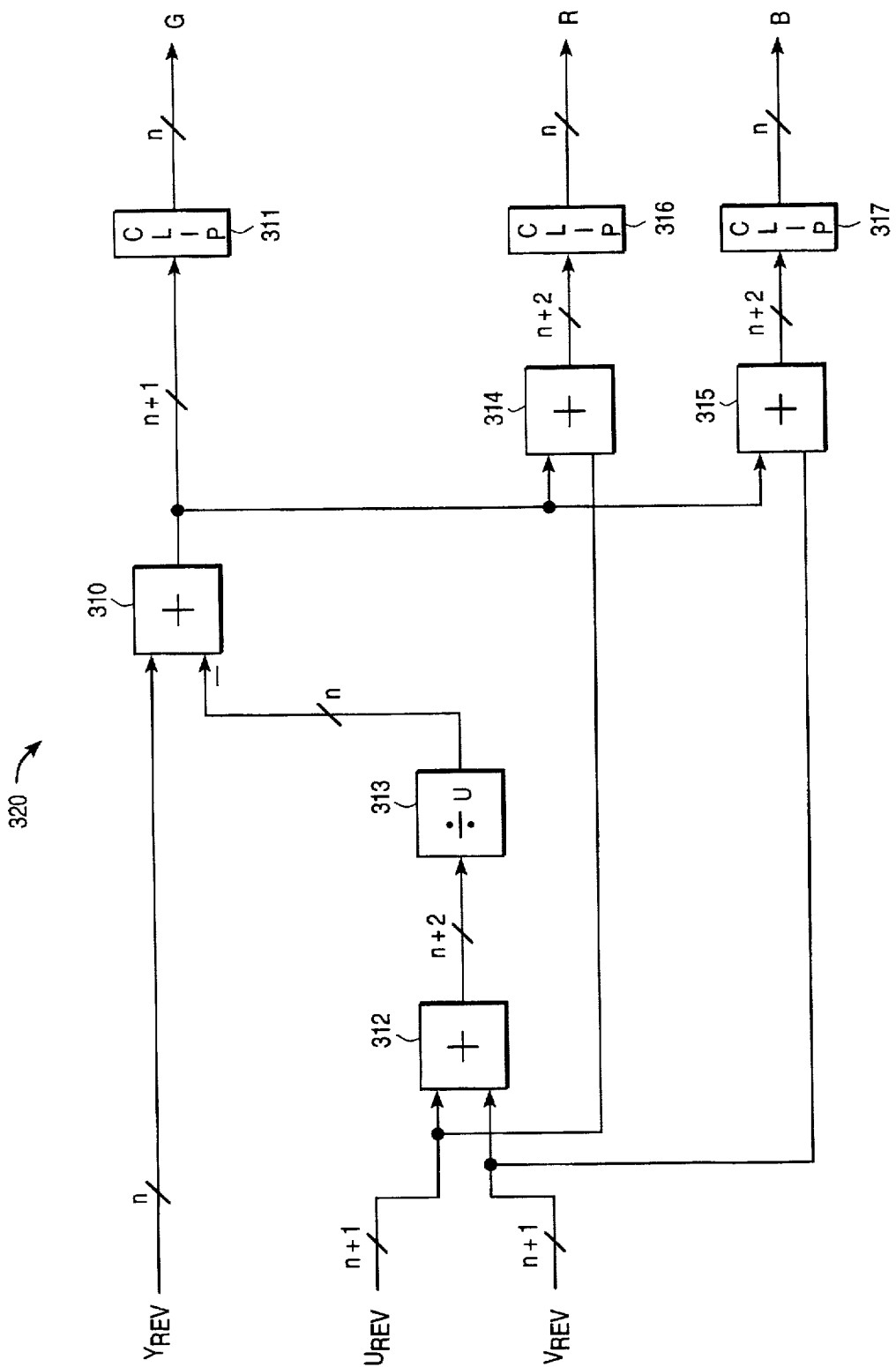
FIG_3B

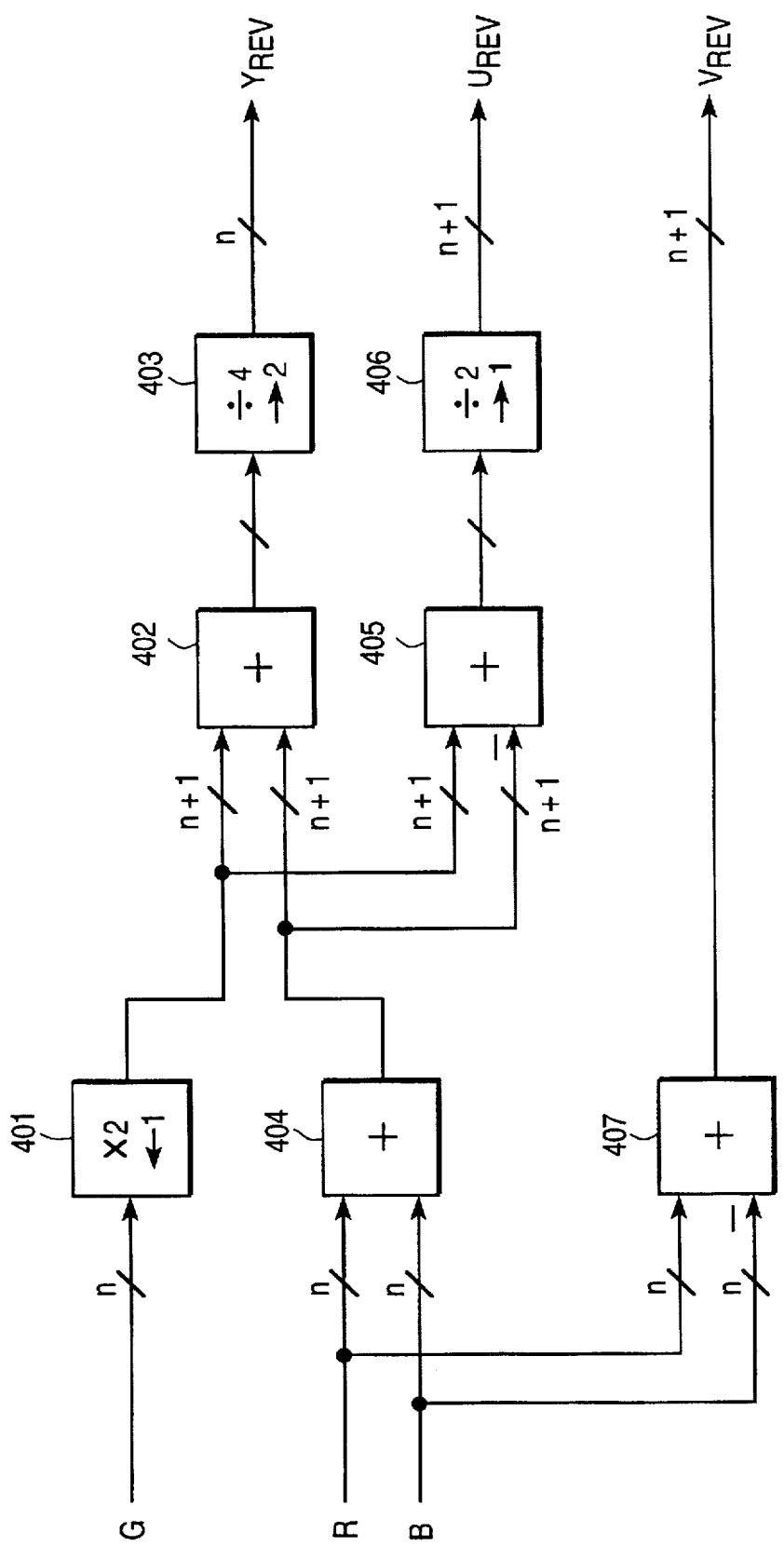
FIG._4

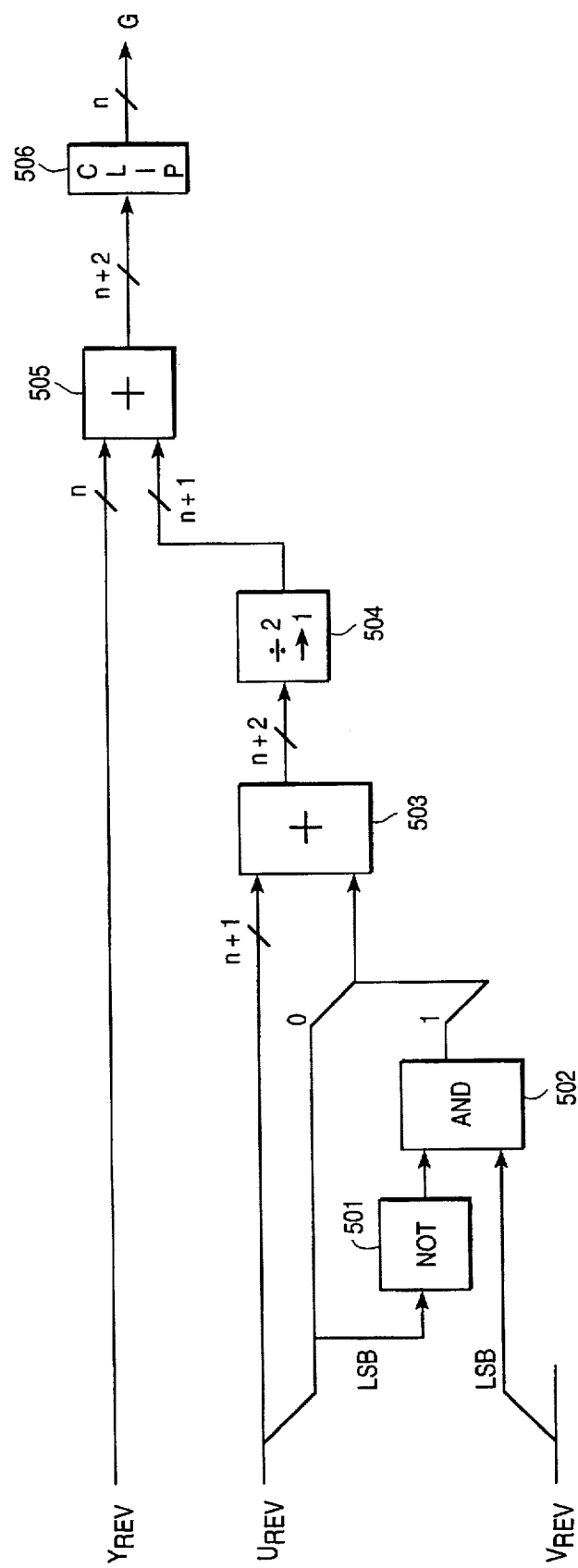
FIG_5

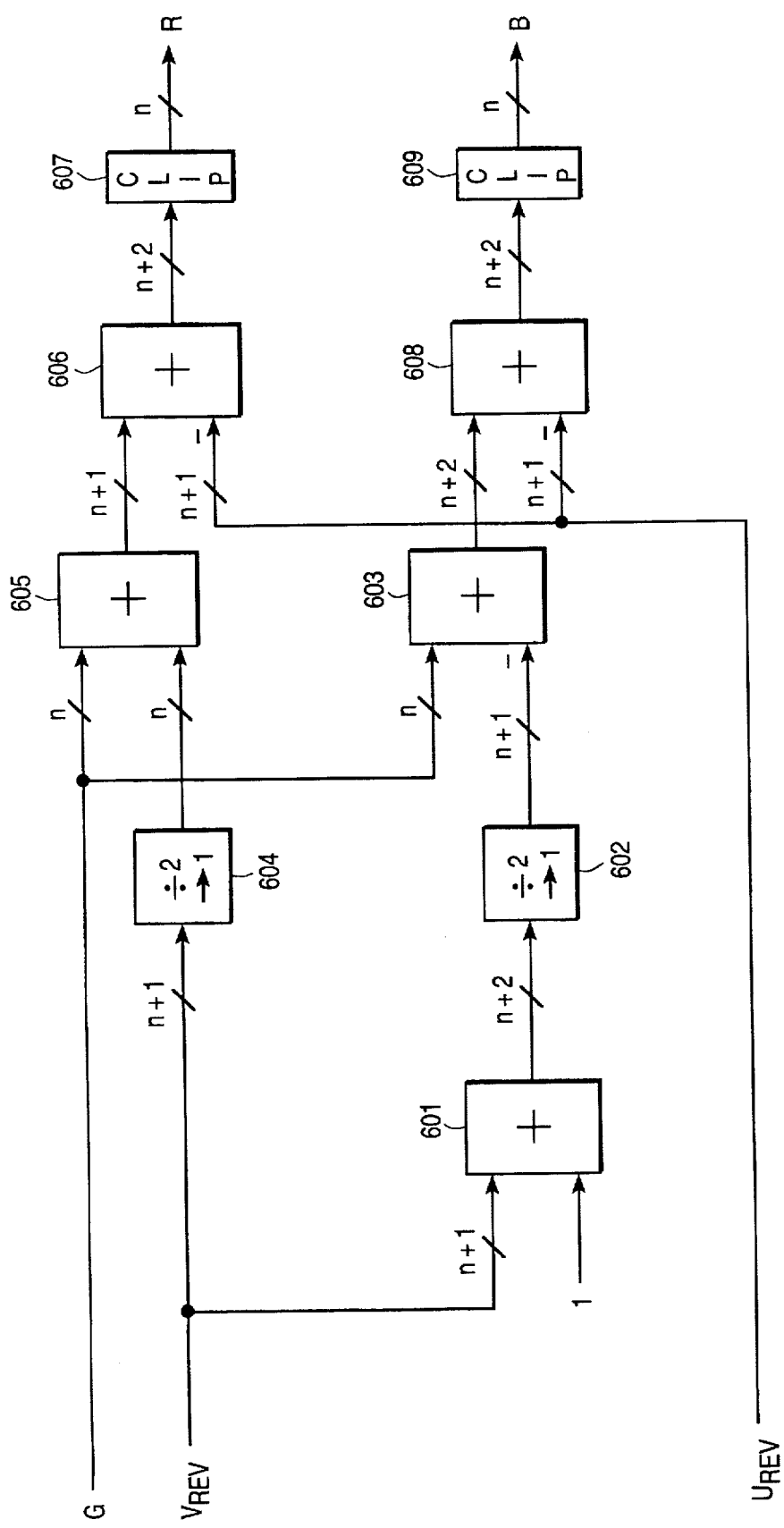
FIG_5

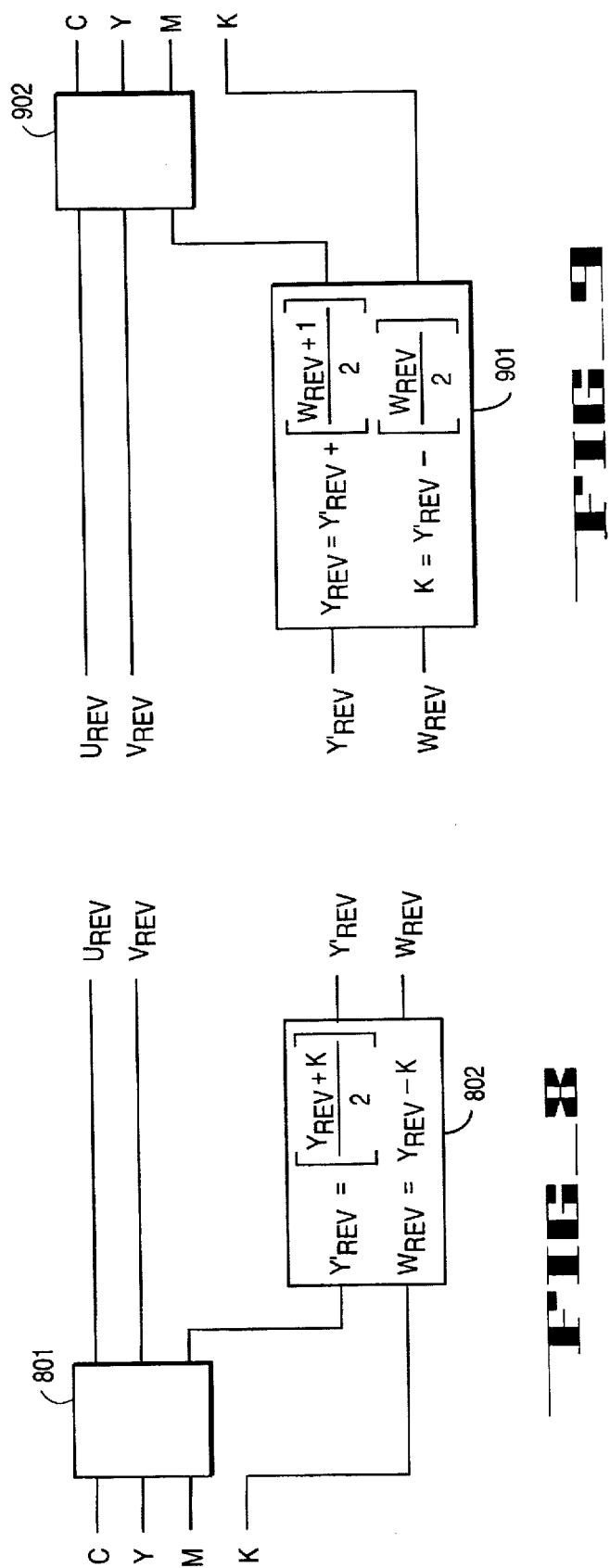

METHOD AND APPARATUS FOR REVERSIBLE COLOR CONVERSION

FIELD OF THE INVENTION

The present invention relates to the field of data compression and decompression systems; particularly, the present invention relates to a method and apparatus for lossless or lossy compression/decompression systems that employ a color space.

BACKGROUND OF THE INVENTION

A color space is a region in a 3-dimensional or higher dimensional vector space. Any basis, such as three linearly independent 3-dimensional vectors, defines a color coordinate system. A commonly used color coordinate system is the R(red), G(green), and B(blue), defined by their center wavelengths. Given one 3-dimensional color coordinate system, other 3-dimensional linear color coordinate systems may be represented by an invertible (non-singular) 3×3 matrix. For example, the Y, I, Q color coordinate system is defined in terms of R, G, B by the following matrix:

$$\begin{bmatrix} Y \\ I \\ Q \end{bmatrix} = \begin{bmatrix} 0.299 & 0.587 & 0.114 \\ 0.596 & -0.274 & -0.322 \\ 0.211 & -0.523 & 0.312 \end{bmatrix} \begin{bmatrix} R \\ G \\ B \end{bmatrix}$$

Note that not all color spaces are linear. For example, to better model the human visual system, some color conversions attempt to non-linearly re-scale vectors (e.g., logrithmically). Examples are CIE L*u*v* and L*a*b*.

Different color coordinate systems are defined for various reasons. For example, for data to be displayed on monitors, it is convenient for most digital color images to use the R, G, B coordinate system, in fixed range, such as 8 bits per coordinate. If the application requires color decorrelation, such as compression, then R, G, B is far from optimal. Other color coordinates such as Y, I, Q mentioned above are more appropriate.

For images used for printing, subtractive color systems, such as CYM (cyan, yellow, magenta), are sometimes used. In some applications, over complete 4-dimensional color spaces, such as CMYK (cyan, yellow, magenta, black), are used.

Data compression is an extremely useful tool for storing and transmitting large amounts of data. For example, the time required to transmit an image, such as a facsimile transmission of a document, is reduced drastically when compression is used to decrease the number of bits required to recreate the image.

Many different data compression techniques exist in the prior art. Compression techniques can be divided into two broad categories, lossy coding and lossless coding. Lossy coding involves coding that results in the loss of information, such that there is no guarantee of perfect reconstruction of the original data. The goal of lossy compression is that changes to the original data are done in such a way that they are not objectionable or detectable. In lossless compression, all the information is retained and the data is compressed in a manner which allows for perfect reconstruction.

In lossless compression, input symbols or intensity data are converted to output codewords. The input may include image, audio, one-dimensional (e.g., data changing temporally), two-dimensional (e.g., data changing in two spatial directions), or multi-dimensional/multi-spectral data. If the compression is successful, the codewords are represented in fewer bits than the number of input symbols (or intensity data). Lossless coding methods include dictionary methods of coding (e.g., Lempel-Ziv), run-length encoding, enumerative coding and entropy coding. In lossless image compression, compression is based on predictions or contexts, plus coding. The JBIG standard for facsimile compression and DPCM (differential pulse code modulation—an option in the JPEG standard) for continuous-tone images are examples of lossless compression for images. In lossy compression, input symbols or intensity data are quantized prior to conversion to output codewords. Quantization is intended to preserve relevant characteristics of the data while eliminating less important data. Prior to quantization, lossy compression system often use a transform to provide energy compaction. Baseline JPEG is an example of a lossy coding method for image data.

Traditionally, converting between color coordinates has been used with quantization for lossy compression. In fact, some color spaces, such as CCIR 601-1 ($YC_RB_R$) are intentionally lossy. In some lossless or lossless/lossy systems, the primary requirement is the reversibility and the efficiency of the conversion. In other lossless/lossy systems, in addition to efficiency of the reversible conversion, the color decorrelation may also be a factor. For example, the 3×3 matrix above is only useful for lossy compression since its entries are non-integer and, thus, will add error during repeated compression and decompression when decorrelation is required. Also the application of the 3×3 matrix is not good with respect to lower order bits. That is, the application of the 3×3 matrix requires use of extra bits to obtain necessary precision and to ensure being able to perform the inverse while being able to reconstruct the lower order bits later—these extra bits reduce compression.

When performing color space conversions, numeric precision problems occur. For instance, in a case where eight bits are input, the transform space required is typically 10 or 11 bits, and even higher precision in the internal calculations, just to obtain a stable color space. If a process within sufficient precision is repeatedly applied in which images are converted from an RGB color space and compressed, and decorepressed and returned to RGB, the result is an accumulation of errors, such that the original colors and the final colors may not match. This is referred to as color drift or the result of an unstable color space.

The present invention provides color conversion. The color conversion of the present invention is completely reversible and may be used with compression/decompression. Because the color conversion is completely reversible, the present invention may be used as part of a lossless compression/decompression process and system.

SUMMARY OF THE INVENTION

The present invention provides a method and apparatus for performing color conversion on image data. The present invention provides a method and apparatus to provide a plurality of vectors representing a datum of the image. The present invention also provides a forward transform that performs reversible color conversion on the plurality of vectors, such that the transform is reversible in integer arithmetic with predictable precision.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A is a block diagram of the lossless system of the present invention.

FIG. 1B is a block diagram of the lossy system of the present invention.

FIG. 2 is a block diagram of one embodiment of the color compression sub-system of the present invention.

FIG. 3A is one embodiment of a forward transform of the present invention.

FIG. 3B is one embodiment of a portion of an inverse transform used to recover the components of a color coordinate system according to the present invention.

FIG. 4 is an alternate embodiment of a forward transform of the present invention.

FIG. 5 is an alternate embodiment of a portion of an inverse transform used to recover one component of a color coordinate system according to the present invention.

FIG. 6 is one embodiment of a portion of an inverse transform for recovering components of a color coordinate system according to the present invention.

FIG. 8 is one embodiment of the forward transform of the present invention for use with a CYMK color space.

FIG. 9 is one embodiment of the inverse transform of the present invention for use with the CYMK color space of FIG. 8.

DETAILED DESCRIPTION OF THE PRESENT INVENTION

Figure 7:
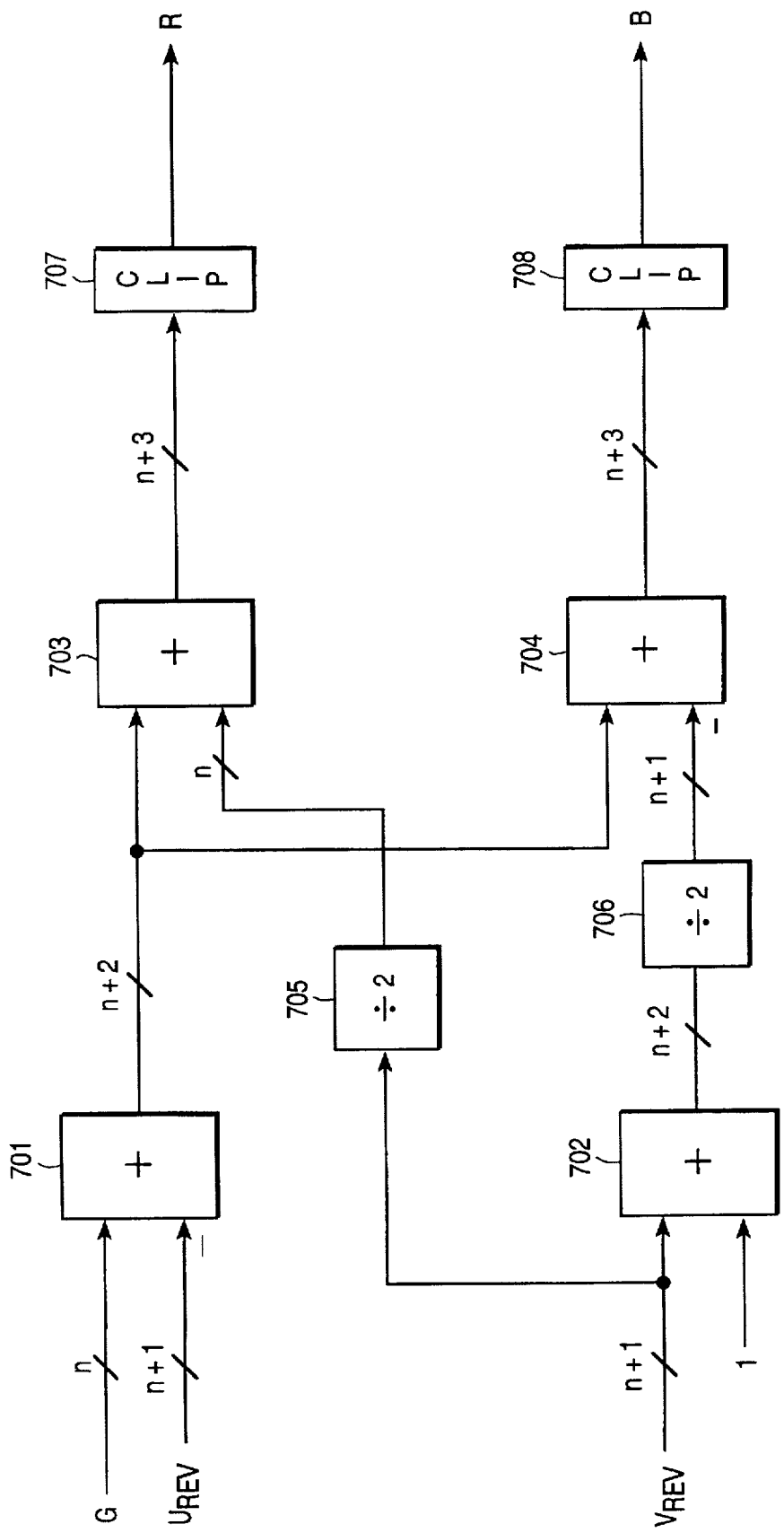
FIG. 7 is an alternate embodiment of a portion of an inverse transform for recovering components of a color coordinate system according to the present invention.

A method and apparatus for color conversion is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the System of the Present Invention

FIG. 1 is a block diagram of one embodiment of the system of the present invention. The system of the present invention uses a gamut matching or color conversion subsystem to allow data from one source to be displayed on or processed for a destination device. That is, the system of the present invention provides a visual representation of data in a particular color space or processes data for use by a destination device. Referring to FIG. 1, multiple sources are shown, such as scanner 101, camera 102, rendering data 103 and negatives 111. Each of these sources produces color data. In one embodiment, scanner 101 produces RGB data, while camera 102 produces RGB or film specific color data. Rendering data 103 may be an RGB or another color space. Negatives 111 produces CYM data. Note that although various sources of data are shown, the system may use one, two or more than three sources of data. Each of the sources feeds a color compression system that includes forward color space converters 104A, 104B, 104C, 104D, . . . The system may include less or more forward color space converters.

The system of the present invention transforms the color space data so as to be completely reversible and implementable in integer arithmetic. That is, the color space data that is converted may be reversed to obtain all of the existing data regardless of any rounding or truncation that occurred during the forward conversion process.

Forward color space converters 104A–D convert the data to enable lossless coder(s) 105A to code the data. Note that this coder(s) 105A may represent one or more lossless coders. A forward color space converters 104A–104D convert the color space data into a form that is more easily compressible by lossless coder(s) 105A. In one embodiment, lossless coders may comprise a JPEG's lossless option, JBIG, Lempel Ziv, arithmetic, Huffman, lossless wavelet, etc.

The present invention may also include color data from a rendering (112) directly into the opponent color space or from a disk or channel 113.

Note that lossless coder(s) 105A comprises the encoder and decoder portion to enable compression and thereafter decompression of the color space data that has been converted by forward color space converters 104A–104C. Furthermore, lossless coder(s) 105A may also include the channel or memory arrangement by which data is handled between the encoding and decoding, or the compression and decompression operations, of lossless coder(s) 105A.

The output of lossless coder(s) 105A is coupled to inputs of one or more inverse color space converters 106A, 10613, 106C. . . . The inverse color space converters 106A–106C convert the color space data back to its original form as received by the forward color space converters 104A–104C. In doing so, any rounding or truncation that occurred as part of the forward transform is recovered. Thus, the portion of the system comprising forward color space converters 104A–D, coder(s) 105, and inverse color space converters 106A–106C comprises a color compression subsystem.

The output of the inverse color space converter is 106A–106C may optionally be coupled to transforms 107A, 107B, 107C respectively. Transforms 107A–107C are device specific transforms capable of transforming the data output from the inverse color space converters 106A–106C to device specific color spaces utilized by output devices in the system. That is, transforms 107A–C perform color conversion for the device. This may include gamut matching or other color space or color preference conversion. If the target output device is known prior to color compression, similar optional color correction 120 can be performed prior to forward color space conversion 104.

The output of transform 107A is coupled to a video display 108. The output of transform 107B is coupled to a printer/copier that produces a hard copy visual representation of the data. Transform 107C is coupled to film output 110. As with the input sources, the destination devices may include more or less than those devices shown in FIG. 1A.

It should be noted that such a system may have applications in art archiving, medical images (e.g., angiogram), pre-press, rendered graphics, compression within a color management system (such as Apple's ColorSync™, Kodak's Precious Color™ and EFI's CMS™ system), graphics and spot color, digital imagery for scientific purposes, legal imagery, LANDsat, and remote sensing applications, etc.

FIG. 1B illustrates a lossy system that includes many of the same components as in the lossless system of FIG. 1A with the exception that the lossless coder(s) 105A have been replaced by lossy coder(s) 105B. The operation is the same as the system in FIG. 1A, except for the lossy coding. Such a system has many applications that involve lower cost implementations of digital video, multi-media, digital cameras and JPEG compression systems, vector quantization, fractal compression, wavelet compression, transform compression (e.g., block-based, overlapped).

Overview of the Color Compression Subsystem of Present Invention

The present invention provides for reversible color conversion. Below, two different transform systems comprising forward and inverse transforms are described that provide reversible color conversion when applied. The transforms are completely reversible in integer arithmetic with predictable precision. That is, any rounding or truncation that occurs during a forward transform is recoverable when performing the inverse transform. Note that the two transform systems described below are not exhaustive and the teachings of the present invention may be applied to many color coordinate systems.

As described above, the present invention may be incorporated in a compression and decompression system having an encoding portion and a decoding portion. Such a system is shown in FIG. 2. The encoding portion is responsible for encoding input data to create compressed data, while the decoding portion is responsible for decoding previously encoded data to produce a reconstructed version of the original input data. In the encoding portion prior to compression, color conversion occurs. Similarly, in the decoding portion after decompression, color conversion occurs again.

The input data to the compression and decompression system may comprise a variety of data types, such as image (still or video), graphics data, etc. In one embodiment, the data is digital signal data; however, analog data digitized, and other formats are possible. The source of the data may be a memory or channel for the encoding portion and/or the decoding portion. Such a system incorporating the present invention may comprise a lossless compression/decompression system or may also be configured to perform lossy compression/decompression.

In the present invention, elements of the encoding portion and/or the decoding portion may be implemented in hardware or software, such as that used in a computer system.

Two Embodiments of the Present Invention

In the following description, the notation of Y, U, V is used for any color coordinates which have Y=R=G=B, U=0, V=0 response on gray scale images defined by R=G=B. If a coordinate is reversible, the notation $Y_{rev}$, $U_{rev}$, $V_{rev}$, is used. Note that the reference to RGB also is not limited to any standard RGB color coordinate system, but refers only to a color coordinate system that is expressed in terms of three coordinates. In non-Red, Green, Blue systems, G is used for the component with the highest information, if any exists.

In one embodiment, the present invention comprises forward and inverse (backward) transforms that provide for reversible color conversion. For explanation purposes, a transform that is not both efficient and reversible is described first. One embodiment of a transform is described below as a 3×3 matrix. The matrix M is based on the color coordinates defined by, $$\begin{bmatrix} 0.25 & 0.5 & 0.25 \\ 1.0 & -1.0 & 0.0 \\ 0.0 & -1.0 & 1.0 \end{bmatrix}$$

Note that the total of the coefficients in the first row when summed is 1, while the total for the other two rows is 0. The first row sums to 1 and the second and third rows sum to 0 to insure the right response to gray-scale images (as discussed above). Also note that in the present invention, the determinate for the matrix, D(matrix M), equals −1.

Continuing the explanation of the present invention, one implementation of matrix M above is the following equations:

$$Y = \frac{R + 2G + B}{4}$$

$$U = R - G$$
$$V = B - G$$

A reversible approximation that comprises one embodiment of a forward transform of the present invention is defined by the following equations $$Y_{rev} = \left\lfloor \frac{R + 2G + B}{4} \right\rfloor$$

-continued $$U_{rev} = R - G$$
$$V_{rev} = B - G$$

The notation $\lfloor . \rfloor$ means to round down to the nearest integer or truncate and is sometimes referred to as the floor function. Similarly, the ceiling function $\lceil . \rceil$ means round up to the nearest integer. The reversible equations are approximations because of the $Y_{rev}$ equation includes an integer divide-by-four operation.

Even though rounding or truncation is used, the above equations represent a reversible color conversion. The following equations prove that the conversion is reversible by constructing the inverse.

$$G = Y_{rev} - \left\lfloor \frac{U_{rev} + V_{rev}}{4} \right\rfloor$$

$$R = U_{rev} + G$$
$$B = V_{rev} + G$$

The proof that the equations are reversible follows, starting with the equation $$Y_{rev} = \left\lfloor \frac{R + 2G + B}{4} \right\rfloor$$

which may be written without the floor function as $$R+2G+B=4Y+e, \quad (1)$$

where e is the truncation error and equals 0, 1, 2 or 3.

In order to solve the above, the equation for the truncation error, e, the equations for $U_{rev}$ and $V_{rev}$ are added together resulting with the equation:

$$U_{rev}+V_{rev}=R+B-2G \quad (2)$$

This equation is then subtracted from (1) above and reordered to obtain the equation:

$$4G=4Y_{rev}-U_{rev}-V_{rev}+e \quad (3)$$

Since the truncation error e is only 0, 1, 2 or 3, only the two least significant bits (LSBs) are used to represent it. The 4G and $4Y_{rev}$ factors do not contribute to those bits. Next, a modulo (MOD) 4 function is applied to the equation:

$$(U_{rev}+V_{rev}-e) \bmod 4 \quad (4)$$

and may be rewritten as:

$$e=(U_{rev}+V_{rev}) \bmod 4 \quad (5)$$

This equation representing the truncation error e is substituted in the equation (3) above as follows:

$$4G=4Y_{rev}-(U_{rev}+V_{rev})-(U_{rev}+V_{rev}) \bmod 4) \quad (6)$$

Both sides of equation (6) are divided by four which essentially eliminates the LSBs. In other words, this replaces the two LSBs of $U_{rev}$ and $V_{rev}$ with zeros, and the equation is solved for G as follows:

$$G = Y_{rev} - \left\lfloor \frac{U_{rev} + V_{rev}}{4} \right\rfloor$$

In an alternative embodiment, the present invention performs color conversion that is based on the following color coordinates:

$$\begin{bmatrix} 0.25 & 0.5 & 0.25 \\ -0.5 & 1.0 & -0.5 \\ 1.0 & 0.0 & -1.0 \end{bmatrix}$$

The matrix may be expressed in the following equations:

$$Y = \frac{R + 2G + B}{4}$$

$$U = \frac{-R + 2G - B}{2}$$

$$V = R - B$$

A reversible approximation that comprises one embodiment of a forward transform of the present invention is given by:

$$Y_{rev} = \left\lfloor \frac{R + 2G + B}{4} \right\rfloor$$

$$U_{rev} = \left\lfloor \frac{-R + 2G - B}{2} \right\rfloor$$

$$V_{rev} = R - B$$

The reversibility is demonstrated by a constructive algorithm in which the G component is recovered first. Once the G component is determined, the R and B inputs may be determined. In one embodiment, the G component is determined using a look-up table (LUT). The G component is equal to $Y_{rev}+(U_{rev}+x)/2$, where the LUT value, a non-linear value, is substituted for the x.

TABLE 1

| LSB ($U_{rev}$) | LSB ($V_{rev}$) | Lookup Value | G |
|---|---|---|---|
| 0 | 0 | 0 | $Y_{rev} + (U_{rev} + 0)/2$ |
| 1 | 0 | 1 | $Y_{rev} + (U_{rev} + 1)/2$ |
| 0 | 1 | 2 | $Y_{rev} + (U_{rev} + 2)/2$ |
| 1 | 1 | 1 | $Y_{rev} + (U_{rev} + 1)/2$ |

It should be noted that the above table may be implemented in logic or in hardware or software, or a combination of the two.

After obtaining G from Table 1, then R and B are recovered as follows:

$$R = G - U_{rev} + \left\lfloor \frac{V_{rev}}{2} \right\rfloor$$

$$B = G - U_{rev} - \left\lfloor \frac{V_{rev} + 1}{2} \right\rfloor$$

To illustrate the proof of the reversibility, the forward equations are repeated. It should be noted that because there are two divisions, two errors must be accounted for.

$$Y_{rev} = \left\lfloor \frac{R + 2G + B}{4} \right\rfloor$$

$$U_{rev} = \left\lfloor \frac{-R + 2G - B}{2} \right\rfloor$$

$$V_{rev} = R - B$$

equations may be rewritten as:

$$R+2G+B=4Y_{rev}+e, \quad (7)$$

where the first truncation error e=0, 1, 2, 3.

$$-R+2G-B=2U_{rev}+f, \quad (8)$$

where the second truncation error f=0, 1.

$$R-B=B_{rev} \quad (9)$$

Next, equations 8 and 9 are added together to produce:

$$2G-2B=2U_{rev}+V_{rev}+f \quad (10)$$

The second truncation error f is set equal to $(V_{rev})$MOD 2 since everything else is even.

When equations 7 and 8 are added together, the following equation results:

$$4G=4Y_{rev}+2U_{rev}+e+f \quad (11)$$

The LSB of e and f are the same, since everything else is even.

Solving for the first truncation error results in the equality:

$$e=(-2U_{rev}-f)\text{MOD } 4$$

and Urev and f are already known.
Once e and f are known, and solving for G, $$G = Y_{rev} + \frac{2U_{rev}+e+f}{4} = Y_{rev} + \frac{U_{rev}+\frac{e+f}{2}}{2}$$

A LUT may then be used to obtain the $$\frac{e+f}{2}$$

value.
If the LSB $V_{rev}$=0→f=0, then $$\frac{2U_{rev}+e}{4} \quad (12)$$

If the LSB of $U_{rev}$=0, then e=0→0(LUT value)
If the LSB of $U_{rev}$=1, then e=2→1(LUT value)
LSB of $V_{rev}$=1→f=1 and
  If the LSB of $U_{rev}$=0, then e=3 f+e=4→2(LUT value)
  If the LSB of $U_{rev}$=1, then e=1, f+e=2→1(LUT value)
An example of RGB values and YUV values that result from using the conversion equation above is shown below:

| RGB | YUV |
| --- | --- |
| 111 | 100 |
| 221 | 101 |
| 121 | 110 |
| 120 | 111 |
| 222 | 200 |
| 211 | 111 |

Note the $$\left\lfloor \frac{-1}{2} \right\rfloor$$

is −1 since $\lfloor \ \rfloor$ rounds towards negative infinity and not towards zero. Based on the above discussion, those skilled in the art may derive the forward and reverse transforms for other reversible color spaces.

Forward and Reverse Transforms of the Present Invention

FIG. 3A is a block diagram of one embodiment of the forward transform of the first embodiment described above. The forward transform shown in FIG. 3A may be part of a compression scheme in which data from a first color space is converted to a second color space prior to compression being applied to the data. This may be done when better compression may be achieved with the data in a second color space.

Referring to FIG. 3A, the forward transform 300 has three inputs, R, G, and B, and produces three outputs, $Y_{rev}$, $U_{rev}$, and $V_{rev}$. In one embodiment, each of the R, G and B inputs is 8 bits in length. Note that the present invention may be configured for inputs of other bit lengths (e.g., 10, 11 . . . 32, . . . ). When the RGB inputs are eight bits, the $Y_{rev}$ output is eight bits and the $U_{rev}$ and $V_{rev}$ outputs are nine bits in length.

Transform 300 comprises a multiply-by-two block 301, adders 302 and 305, subtractors 303 and 304, and divide-by-four 306. In one embodiment, the multiplications and divisions are implemented as hardwired shifts and, thus, have little hardware cost.

Multiply-by-two block 301 multiplies the G input of n bits by two. In one embodiment, multiply-by-two 301 comprises shifting logic to shift the n bits one bit to the left (where the bits are aligned from left (MSB) to right (LSB)) to perform the multiplication. The result of the shifts are n+1 bits that are sent to one input of adder 305.

Adder 302 adds the n-bit R input to the n-bit B input producing an (n+1)-bit output. The (n+1)-bit output of adder 302 is added to the output of multiply-by-two block 301 using adder 305. The output of adder 305 is an (n+2)-bit number that is coupled to the input of divide-by-four 306.

Divide-by-four 306 divides the (n+2)-bit input by four, producing an n-bit output. The n-bit output comprises the $Y_{rev}$ output of forward transform 300. In one embodiment, the divide-by-four 306 comprises shifting logic and performs a divide operation by shifting the output of adder 305 two bit position to the right (where the bits are aligned from left (MSB) to right (LSB)).

Subtractor 303 subtracts the n-bit G input from the n-bit R input to produce an (n+1)-bit number that represents the $U_{rev}$ output of forward transform 300.

Subtractor 304 subtracts the n-bit G input from the n-bit B input to produce an (n+1)-bit output of forward transform 300. The (n+1)bit output of adder 304 represents the $V_{rev}$ output of forward transform 300.

The $Y_{rev}$, $U_{rev}$ and $V_{rev}$ outputs generated with forward transform 300 may be forwarded to a system or mechanism to undergo compression in a lossless or lossy system. Since 3×n bits of input results in 3×n+2 bits of output, a reversible transform in integer arithmetic with predictable precision is provided.

FIG. 3B illustrates one embodiment of the inverse transform of the first embodiment of the present invention described above. The inverse color transform 320 recovers the G, R and B components.

Referring to FIG. 3B, the inverse color transform 320 comprises adders 312, 314 and 315, divide-by-four block 313, subtractor 310 and clipping logic 311, 316 and 317. The inverse transform 320 is coupled to receive the $Y_{rev}$, $U_{rev}$ and $V_{rev}$ inputs and produces the G, R and B components. In one embodiment the $Y_{rev}$, $U_{rev}$ and $V_{rev}$ components comprise n bits, n+1 bits and n+1 bits respectively. In one embodiment, Adder 312 adds the $U_{rev}$ and $V_{rev}$ inputs to produce an (n+1)-bit output. The (n+1)-bit output is divided by four by divide-by-four block 313. In one embodiment, the divide-by-four 313 comprises shifting logic to shift the n+2 input bits to the right two positions (where the bits are aligned from left (MSB) to right (LSB)) to perform the division. The output of divide-by-four 313 is subtracted from the $Y_{rev}$ input using subtractor 310. The output of subtractor 310 is an (n+1)-bit number that is input to clipping logic 311. In one embodiment, clipping logic 311 performs addition or subtraction to force the (n+1)-bit number into a range (e.g., 256), thereby producing an n-bit G component as an output of inverse transform 320. For instance, if clipping for 8 bits, if the input is less than 0, then the output is 0; otherwise if the input is greater than 255, then the output is 255; otherwise, the output is equal to the input.

Adder 314 adds the $U_{rev}$ input to the output of subtractor 310 to produce an (n+2)obit output. Clipping logic 316 forces the (n+2)-bit number into the desired range, thereby producing an n-bit number representing the R component that is output from the inverse transform 320.

Adder 315 adds the $V_{rev}$ input to the output of subtractor 320 to produce an (n+2)-bit number. Clipping logic 317 produces an n-bit number representing the B component output of inverse transform 320.

Note in the above inverse transform, if the system employing the color conversion is a lossless compression system, clipping logic is not necessary since the output of the adders will be n-bits in length. However, if the $Y_{rev}$, $U_{rev}$ and $V_{rev}$ inputs have been created and have been subjected to quantization during processing, then clipping logic is necessary to ensure that the output is in the correct range (e.g., the correct number of bits).

An Alternative Embodiment of the Forward and Inverse Transforms of the Present Invention FIG. 4 is a block diagram of one embodiment of the forward transform of second embodiment described above. The forward transform shown in FIG. 4 may be part of a compression scheme in which data from a first color space is converted to a second color space prior to compression being applied to the data. This may be done when better compression may be achieved with the data in the second color space.

Referring to FIG. 4, the forward transform 400 has three inputs, R, G, and B, and produces three outputs, $Y_{rev}$, $U_{rev}$, and $V_{rev}$. In one embodiment, each of the R, G, and B inputs is 8 bits in length. Note that the present invention may be configured for inputs of other bit lengths (e.g., 10, 11, ... 32, ...). When the R, G, and B inputs are 8 bits, the $Y_{rev}$ output is 8 bits and the $U_{rev}$ and $V_{rev}$ outputs are 9 bits in length.

Transform 400 comprises a multiply-by-two block 401, two-input adders 402 and 404, subtractors 405 and 407, divide-by-four block 403 and a divide-by-two 406. In one embodiment, the multiplication's and divisions are implemented as hardwired shifts and, thus, have little hardware cost.

Multiply-by-two block 401 is coupled to receive n-bit G input and multiplies the n-bits by two. In one embodiment, multiply-by-two 401 comprises shifting logic to shift the n bits one bit to the left (where the bits are aligned from left (MSB) to right (LSB)) to perform the multiplication. The results of the shift are n+1 bits and are coupled to one input of adder 402 one input of subtractor 405.

Adder 404 adds the n-bit R input to the n-bit B input producing an (n+1)-bit output. The (n+1)-bit output from adder 404 is coupled to one input of adder 402 and one input of subtractor 405.

Adder 402 adds the two (n+1)-bit inputs and produces an (n+2)-bit output, which is coupled to the input of divide-by-four 403. Divide-by-four 403 divides the (n+2)-bit input by four, producing an n-bit output. In one embodiment, divide-by-four 403 comprises shifting logic and performs the divide operation by shifting the n+2 bits two positions to the right (where the bits are aligned from left (MSB) to right (LSB)) to perform the division. The n-bit output from block 403 comprises the $Y_{rev}$ output of forward transform 400.

Subtractor 405 subtracts the n-bit output from adder 404 from the n-bit output of multiply-by-two block 401. The output of subtractor 405 comprises n+2 bits and is coupled to an input of divide-by-two 406.

Divide-by-two 406 divides its (n+2)-bit input by two. In one embodiment, divide-by-two 406 comprises shifting logic to perform the division and performs the division operation by shifting the n+2 bits one bit position to the right (where the bits are aligned from left (MSB) to right (LSB)). The result of the addition is an (n+1)-bit output that comprises the $U_{rev}$ output of forward transform 400.

Adder 407 adds the n-bit R input to the n-bit B input to produce an (n+1)-bit output. The (n+1)-bit output of adder 407 comprises the $V_{rev}$ output.

As stated above with respect to the previously described embodiment, the $Y_{rev}$, $U_{rev}$ and $V_{rev}$ outputs generated with forward transform 200 may be forwarded to a system or mechanism to undergo compression in a lossless or lossy system. Since 3×n bits of input results in 3×n+2 bits of output, a reversible transform in integer arithmetic with predictable precision is provided.

FIGS. 5 and 6 illustrate one embodiment of the inverse transform of second embodiment of the present invention described above. FIG. 5 is a block diagram of the inverse color transform for the recovery of the G component. The inverse color transform for the recovery of the G component performs according to Table 1. FIG. 6 is a block diagram of the inverse color transform for the recovery of the R and B components.

Referring to FIG. 5, the inverse color transform 500 comprises NOT logic 501, AND gate logic 502, adders 503 and 505, divide-by-two block 504 and clipping logic 506 and is coupled to receive the $Y_{rev}$, $U_{rev}$ and $V_{rev}$ inputs. The $Y_{rev}$, $U_{rev}$ and $V_{rev}$ components comprise n bits, n+1 bits and n+1 bits respectively. In one embodiment, n is 8.

The NOT block 501 is coupled to receive the LSB of the $U_{rev}$ input and outputs an inverted LSB. AND gate logic 502 is coupled to receive the inverted LSB of the $U_{rev}$ input and the LSB of the $V_{rev}$ input. The output of AND gate logic 502 is joined with the LSB of the $U_{rev}$ input to form one input to adder 503. Adder 503 adds these two bits to the bits of the $U_{rev}$ input. Thus, the LSB of $U_{rev}$ and $V_{rev}$ are used to form a two bit number that is added to $U_{rev}$. The result produced by adder 503 is an (n+2)-bit number. Operating together, the NOT block 501, AND gate logic 502 and adder 503 undo the rounding/truncation as specified in Table 1.

Divide-by-two 504 is coupled to receive the output of adder 503 and adds two to the result. In one embodiment, divide-by-two 504 comprises shifting logic to shift the n+2 input bits to the right one position (where the bits are aligned from left (MSB) to right (LSB)) to perform the division. The output of divide-by-two 504 is n+1 bits and is coupled as one input to adder 505. Adder 505 adds the n bits of the $Y_{rev}$ input to the n+1 bits output from divide-by-two 504, producing an (n+2)-bit output.

Clipping logic 506 receives the (n+2)-bit output from adder 505 and forces the inputs to an acceptable range using, for instance, addition and subtraction, in order to produce the G output. If the system employing the color conversion is a lossless compression system, clipping logic 506 is not necessary since the output of adder 505 will be n-bits in length. However, if the $Y_{rev}$, $U_{rev}$ and $V_{rev}$ inputs had been created and been subjected to quantization during processing, then clipping logic 506 is necessary to ensure that the output is in the correct range (e.g., the correct number of bits). If clipping for 8 bits, if the input is less than 0, then the output is 0; otherwise if the input is greater than 255, then the output is 255; otherwise, the output is equal to the input.

Once the n-bit G component has been recovered, the inverse color transform for the recovery of the R and B components may be used. FIG. 6 illustrates one embodiment of such an inverse color transform. Referring to FIG. 6, inverse transform logic 600 comprises adders 601 and 605, divide-by-two 602 and 604, subtractors 603, 606 and 608, and clipping logic 607 and 609. Inverse transform logic 600 generates the R and B components in response to the G component and the $U_{rev}$ and $V_{rev}$ components as inputs. In one embodiment, the $U_{rev}$ and $V_{rev}$ inputs are both (n+1)-bit numbers, while the G input comprises an n-bit number.

Adder 601 adds the (n+1)-bit $V_{rev}$ input to 1 and outputs an (n+2)-bit result which coupled to divide-by-two 602. Divide-by-two 602 divides the (n+2)-bit input by two, producing an (n+1)-bit result, which is coupled to one input of subtractor 603. In one embodiment, block 602 comprises shifting logic that shifts the (n+2)-bit input one bit position to the right (where the bits are aligned from left (MSB) to right (LSB)) to perform the division.

Subtractor 603 subtracts the output of divide-by-two 602 from the G input. The results of the subtraction are an (n+2)-bit result that is coupled to one input of subtractor 608.

Subtractor 608 is coupled to receive the $U_{rev}$ input as well as the output from subtractor 603. Subtractor 608 subtracts the $U_{rev}$ input from the output of subtractor 603, thereby producing an (n+3)-bit result. The (n+3)-bit result is input to clipping logic 609 which produces an n-bit output representing the B component. Note that clipping logic 609 (as well as clipping logic 607) may only be needed when the color conversion of the present invention is incorporated into a lossy compression system.

Divide-by-two 604 is coupled to receive the (n+1)-bit $V_{rev}$ input and divides it by two. In one embodiment, divide-by-two 604 comprises shifting logic that shifts the n+1 bits of the $V_{rev}$ input to the right one bit position (where the bits are aligned from left (MSB) to right (LSB)) to perform the division. The output of divide-by-two 604 is added to the n-bit G component input by adder 605. The results of the addition are an (n+1)-bit input which is coupled to one input of subtractor 606.

Subtractor 606 is coupled to receive and subtract the $V_{rev}$ input from the (n+1)-bit output of adder 605. The result of the subtraction comprises an (n+2)-bit number that is coupled to an input of clipping logic 607. Clipping logic 607 forces the result into the correct range and outputs the remaining n bits as the R component. As described above, clipping logic 607 is not required when the color conversion is used as part of a lossless compression scheme.

FIG. 7 illustrates an alternative embodiment of the inverse color transform for the recovery of the R and B components. Referring to FIG. 7, the inverse color transform implementation comprises subtractors 701 and 704, adders 702 and 703, divide-by-two blocks 705 and 706 and clipping logic 707 and 708. The divide-by-two 705 may be implemented as a hardwired shift as described above. The inverse color transform generates the R and B components in response to the G component and the $U_{rev}$ and $V_{rev}$ inputs. The G component comprises an n-bit number, while the $U_{rev}$ and $V_{rev}$ inputs comprise n+1 bit numbers.

After the G component has been generated, subtractor 701 subtracts the $U_{rev}$ input from the G component. The result of the subtraction is outputted to an input of adder 703. In one embodiment, the output of subtractor 701 is an (n+2)-bit number.

Divide-by-two 705 divides the $V_{rev}$ input by two, the result of which is input to the other input of adder 703. In one embodiment, divide-by-two 705 comprises shifting logic as described above. In one embodiment, the output of divide-by-two 705 is an n-bit number. Adder 703 adds the output of subtractor 701 to the output of divide-by-two 705. In one embodiment, the output of adder 703 comprises an (n+3)-bit number. Clipping logic 707 receives and forces the output of adder 703 to a desired range to produce the R component.

Adder 703 adds the $V_{rev}$ input to 1. The output of adder 702 is coupled to an input of divide-by-two 706. In one embodiment, the output of adder 702 is an (n+2)-bit number. Divide-by-two 706 divides its input by two, outputting the result to subtractor 704. In one embodiment, divide-by-two 706 comprises shifting logic as described above and shifts its input one bit position. In one embodiment, the output of divide-by-two 706 comprises an (n+1)-bit number.

Subtractor 704 subtracts the output of divide-by-two 706 from the output of subtractor 701. The output of subtractor 704 is sent to clipping logic 708. In one embodiment, the output of subtractor 704 is an n+3 bit number.

Clipping logic 708 produces the B component where the output of subtractor 704 is an (n+3)-bit number, clipping logic 708 forces the output of subtractor 704 to an n-bit number, representing the B component.

The forward and inverse transforms described above may be incorporated into a system in which an image is decomposed into three components based on given color coordinates. An offset equal of 256 may be added to the components to convert the 9-bit signed integers into 9-bit unsigned integers. Each component then is independently compressed. Such compression may include, for example, a combination of Gray code followed by JBIG applied to each bit-plane. It will be apparent to those skilled in the art that the present invention may be used in other compression/decompression systems.

FIG. 8 illustrates the present invention being applied to CMYK. Note that in such a case, Y (yellow) may be used for the G component. In an alternative embodiment, C (cyan) may be used for the G component. Referring to FIG. 8, the cyan (C), yellow (Y) and magenta (M) components are transformed by transform block 801 to produce the $Y_{rev}$, $V_{rev}$ and $Y_{rev}$ outputs. Transform block 801 performs the transform according to the transform defined above. The black (K) components along with the $Y_{rev}$ output from transform block 801 are input to transform block 802 which produces the $Y'_{rev}$ and the $W_{rev}$ outputs. Thus, the output of the CYMK system of FIG. 8 is the $U_{rev}$, $V_{rev}$, $Y'_{rev}$ and $W_{rev}$ outputs. In one embodiment, block 802 generates the $Y'_{rev}$ and $W_{rev}$ outputs according to the equations:

$$Y'_{rev} = \left\lfloor \frac{Y_{rev} + K}{2} \right\rfloor$$

$$W_{rev} = Y_{rev} - K$$

FIG. 9 illustrates the inverse transform for the CYMK transform of FIG. 8. Referring to FIG. 9, block 901 receives the $Y'_{rev}$ and $W_{rev}$ components and generates the K and $Y_{rev}$ components. In one embodiment, the K and $Y_{rev}$ components are generated according to the equations:

$$Y_{rev} = Y'_{rev} + \left\lfloor \frac{W_{rev} + 1}{2} \right\rfloor$$

$$K = Y_{rev} - \left\lfloor \frac{W_{rev}}{2} \right\rfloor$$

The $Y_{rev}$ component, along with the $U_{rev}$ and $V_{rev}$ components are then fed into block 902, which produces the C, Y and M components. In one embodiment, block 902 performs a transform discussed above.

Although the above color conversion process has been described with reference to three vectors, the techniques of the present invention may be applied to color conversions involving other numbers of vectors (e.g., 4, 5, etc.) Likewise, the present invention may be applied to non-color vectors where a conversion process is utilized.

Thus, the present invention provides for reversible color conversion implemented in integer arithmetic with predictable results.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, an apparatus and method for reversible color conversion has been described.

We claim:

1. A system comprising:
   at least one source of a plurality of vectors of color data;
   a lossless color conversion subsystem coupled to said at least one source to perform reversible color conversion on the plurality of vectors, wherein the color conversion subsystem comprises a forward transform that performs color space conversion that is reversible in integer arithmetic; and
   at least one destination device coupled to the color conversion subsystem for manipulating the plurality of vectors after reconversion by said color conversion system.

2. The system defined in claim 1 wherein the color conversion system is operable to recover any rounding or truncation that occurs during color conversion.

3. The system defined in claim 1 wherein the transform operates according to a matrix and the matrix has a determinant of 1.

4. The system defined in claim 3 wherein at least one row of the matrix sums to approximately 1, while remaining rows sum to approximately zero.

5. The system defined in claim 1 further comprising an inverse transform.

6. The system defined in claim 1 wherein the forward transform comprises:
   a first input, a second input and a third input, wherein the first, second and third inputs are coupled to receive at least a portion of the plurality of vectors;
   a first output, a second output and a third output;
   a multiplier coupled to receive the first input for multiplying the first input by a first number to generate a first result;
   a first adder coupled to receive the second and third inputs for adding the second and third inputs to generate a second result;
   a second adder coupled to receive the first and second results for adding the first and second results to generate a third result;
   a first divider coupled to receive the third result for dividing the third result by a second number to produce the first output;
   a first subtractor coupled to receive the first and second results for subtracting the second result from the first result to generate a fourth result;
   a second divider coupled to receive the fourth result for dividing the fourth result by a third number to produce the second output; and
   a second subtractor coupled to receive the second and third inputs for subtracting the third input from the second input to produce the third output.

7. The system defined in claim 6 wherein the first number comprises two.

8. The system defined in claim 6 wherein the multiplier comprises shifting logic.

9. The system defined in claim 6 wherein the second number and the third number comprise four and two respectively.

10. The system defined in claim 6 wherein the first divider and second divider comprise shifting logic.

11. The system defined in claim 6 wherein each of the first, second and third inputs comprise n-bits in length, the first output comprise n-bits in length, and the second and third outputs comprise n+1 bits in length.

12. The system defined in claim 1 wherein the forward transform comprises:
   a first input, a second input and a third input, wherein the first, second and third inputs are coupled to receive at least a portion of the plurality of vectors;
   means for generating a first output comprising
     first multiplication means for multiplying the first input by two to generate a first result,
     first addition means for adding the second and third inputs to generate a second result,
     second addition means for adding the first and second results to generate a third result,
     first dividing means for dividing the third result by four to produce the first output;
   means for generating a second output comprising
     second multiplication means for multiplying the first input by two to generate a fourth result,
     third addition means for adding the second and third inputs to generate a fifth result,
     first subtracting means for subtracting the fifth result from the fourth result to generate a sixth result,
     second dividing means for dividing the sixth result by two to produce the second output; and
   means for generating a third output comprising
     second subtraction means for subtracting the third input from the second input to produce the third output.

13. The system defined in claim 1 wherein the forward transform comprises:
   a first input, a second input and a third input, wherein the first, second and third inputs are coupled to receive at least a portion of the plurality of vectors;
   means for generating a first output comprising
     first multiplication means for multiplying the first input by a first number to generate a first result,
     first addition means for adding the second and third inputs to generate a second result,
     second addition means for adding the first and second results to generate a third result,
     first dividing means for dividing the third result by four to produce the first output;
   means for generating a second output comprising first subtracting means for subtracting the first input from the second input to generate the second output; and means for generating a third output comprising second subtraction means for subtracting the first input from the third input to produce the third output.

14. The system defined in claim 1 wherein the forward transform comprises:
a first input, a second input and a third input, wherein the first, second and third inputs are coupled to receive at least a portion of the plurality of vectors;
a first output, a second output and a third output;
a multiplier coupled to receive the first input for multiplying the first input by a first number to generate a first result;
a first adder coupled to receive the second and third inputs for adding the second and third inputs to generate a second result;
a second adder coupled to receive the first and second results for adding the first and second results to generate a third result;
a first divider coupled to receive the third result for dividing the third result by a second number to produce the first output;
a first subtractor coupled to receive the first and second inputs for subtracting the first input from the second input to generate a fourth result; and
a second subtractor coupled to receive the first and third inputs for subtracting the first input from the third input to produce the third output.

15. The system defined in claim 14 wherein the first number comprises two.

16. The system defined in claim 14 wherein the multiplier comprises shifting logic.

17. The system defined in claim 14 wherein the first divider comprises shifting logic.

18. The system defined in claim 14 wherein each of the first, second and third inputs comprise n-bits in length, the first output comprise n-bits in length, and the second and third outputs comprise n+1 bits in length.

19. A system comprising:
at least one source of a plurality of vectors of color data;
a color conversion subsystem coupled to said at least one source to perform reversible color conversion on the plurality of vectors, wherein the color conversion subsystem comprises:
a forward transform that performs color space conversion that is reversible in integer arithmetic, and
an inverse transform to regenerate the plurality of vectors from outputs $Y_{rev}$, $U_{rev}$ and $V_{rev}$ according to the following equations:

$$G = Y_{rev} + (U_r + x)/2$$

$$R = G - U_{rev} + \left\lfloor \frac{V_{rev}}{2} \right\rfloor$$

$$B = G - U_{rev} - \left\lfloor \frac{V_{rev}+1}{2} \right\rfloor$$

where R, G and B comprise components of the plurality of vectors and x is a non-linear value; and
at least one destination device coupled to the color conversion subsystem for manipulating the plurality of vectors after reconversion by said color conversion system.

20. The system defined in claim 19 wherein x comprises a lookup table (LUT) value.

21. The system defined in claim 19 wherein x is generated by logic.

22. The system in claim 19 wherein x is generated by software.

23. The system defined in claim 19 wherein x comprises a lookup table (LUT) value.

24. The system defined in claim 19 wherein x is generated by logic.

25. The system in claim 19 wherein x is generated by software.

26. A method for performing lossless color conversion comprising the steps of:
forward transforming a plurality of vectors from a first color space to a second color space using integer arithmetic; and
inverse transforming the plurality of vectors in the second color space to the first color space using integer arithmetic, wherein any truncation and rounding performed during the color conversion are recovered so that the color conversion is lossless and the plurality of vectors are losslessly recovered where output of forward transforming has been losslessly maintained prior to inverse transforming.

27. The method defined in claim 26 further comprising the steps of:
compressing the plurality of vectors after being transformed into the second color space; and
decompressing the compressed version of the plurality of vectors in the second color space prior to their retransformation into the first color space.

28. A system comprising:
a lossless color conversion subsystem to reverse a reversible color conversion performed on a plurality of vectors, wherein the color conversion subsystem comprises an inverse transform to regenerate the plurality of vectors so that color conversion is lossless and the plurality of vectors are losslessly recovered where output of forward transforming has been losslessly maintained prior to inverse transforming; and
at least one destination device coupled to the color conversion subsystem for manipulating the plurality of vectors after reconversion by said color conversion system.

29. The system defined in claim 28 wherein the inverse transform comprises:
a first input, a second input and a third input, wherein the first, second and third inputs are coupled to receive at least a portion of the plurality of vectors;
a first output, a second output and a third output;
a first output generator to generate the first output in response to the first, second, and third inputs;
a first adder to add the third input to one to generate a first result;
a first divider to divide the first result by a first number to produce a second result;
a first subtractor to subtract the second result from the first output to produce a third result;
a second subtractor to subtract the second input from the third result to produce a fourth result, wherein the fourth result is output as the third output;
a second divider to divide the third input by a second number to produce a fifth result;
a second adder to add the fifth result to the first output to produce a sixth result; and
a third subtractor to subtract the second input from the sixth result to produce a seventh result, wherein the seventh result comprises the second output.

30. The system defined in claim 29 further comprising clipping logic coupled to perform clipping on the fourth result and the seventh result prior to their output as the second and third outputs.

31. The system defined in claim 29 wherein the first output generator comprises:
- a NOT logical operation block inverting the LSB of the second input to produce an inverted LSB;
- an AND logical operation block coupled to receive the inverted LSB and the LSB of the third input to perform an AND operation between-bit the LSB of the third input and the inverted LSB of the second input to produce an eighth result;
- a first adder coupled to receive the first result and the LSB of the second input as one input and the second input as another input, wherein the adder adds the second input to said one input to produce a ninth result;
- a divider coupled to receive the second result for dividing the second result by a first number to produce a tenth result; and
- a second adder coupled to receive and add the first input and the tenth result to generate the first output.

32. The system defined in claim 31 further comprising clipping logic to clip the first output to a predetermined number of bits.

33. The system defined in claim 31 wherein the divider comprises shifting logic.

34. The system defined in claim 28 wherein the inverse transform comprises:
- a first input, a second input and a third input, wherein the first, second and third inputs are coupled to receive at least a portion of the plurality of vectors;
- a first output, a second output and a third output;
- a first adder to add the second and third inputs to generate a first result;
- a first divider to divide the first result by a first number to produce a second result;
- a first subtractor to subtract the second result from the first input to produce a third result, wherein the third result comprises the first output;
- a second adder to add the third result and the second input to produce a fourth result, wherein the fourth result comprises the second output; and
- a third adder to add the third input to the third result to produce a fifth result, wherein the fifth result comprises the third output.

35. The system defined in claim 34 further comprising clipping logic coupled to perform clipping on the third, fourth and fifth results prior to their output as the first, second and third outputs.

36. The system defined in claim 34 wherein the divider comprises shifting logic.

37. A system comprising:
at least one source of a plurality of vectors of color data;
a color conversion subsystem coupled to said at least one source to perform reversible color conversion on the plurality of vectors, wherein the color conversion subsystem comprises a forward transform that performs color space conversion that is reversible in integer arithmetic, wherein the transform generates outputs $Y_{rev}$, $U_{rev}$ and $V_{rev}$ according to the following equations:

$$Y_{rev} = \left\lfloor \frac{R + 2G + B}{4} \right\rfloor$$

$$U_{rev} = R - G$$
$$V_{rev} = B - G$$

where R, G and B comprises components in each of the plurality of vectors; and
at least one destination device coupled to the color conversion subsystem for manipulating the plurality of vectors after reconversion by said color conversion system.

38. A system comprising:
at least one source of a plurality of vectors of color data;
a color conversion subsystem coupled to said at least one source to perform reversible color conversion on the plurality of vectors, wherein the color conversion subsystem comprises a forward transform that performs color space conversion that is reversible in integer arithmetic, wherein the transform generates outputs $Y_{rev}$, $U_{rev}$ and $V_{rev}$ according to the following equations:

$$Y_{rev} = \left\lfloor \frac{R + 2G + B}{4} \right\rfloor$$

$$U_{rev} = \left\lfloor \frac{-R + 2G - B}{2} \right\rfloor$$

$$V_{rev} = R - B$$

where R, G and B comprise components in each of the plurality of vectors; and
at least one destination device coupled to the color conversion subsystem for manipulating the plurality of vectors after reconversion by said color conversion system.

39. A system comprising:
at least one source of a plurality of vectors of color data;
a color conversion subsystem coupled to said at least one source to perform reversible color conversion on the plurality of vectors, wherein the color conversion subsystem comprises:
a forward transform that performs color space conversion that is reversible in integer arithmetic, and
an inverse transform to regenerate the plurality of vectors from outputs $Y_{rev}$, $U_{rev}$ and $V_{rev}$ according to the following equations:

$$G = Y_{rev} - \left\lfloor \frac{U_{rev} + V_{rev}}{4} \right\rfloor$$

$$R = U_{rev} + G$$
$$B = V_{rev} + G$$

where R, G and B comprise components of the plurality of vectors; and
at least one destination device coupled to the color conversion subsystem for manipulating the plurality of vectors after reconversion by said color conversion system.

40. A lossless system for processing data comprising:
a color conversion mechanism to decorrelate the data, wherein the color conversion mechanism comprises a forward transform performing a reversible color conversion on a plurality of vectors, such that the transform is reversible in integer arithmetic and any rounding and truncation performed during color conversion are recoverable; and a lossless compression mechanism coupled to receive the output of the color conversion mechanism to compress the output into compressed data.

41. A lossless system for processing compressed data comprising:
a lossless decompression mechanism coupled to receive the compressed data to decompress the compressed data; and
an inverse transform coupled to receive the decompressed data to correlate the data to reverse color conversion in integer arithmetic and recover information lost due to any rounding or truncation performed during color conversion.

42. A method for performing color conversion comprising the steps of:
forward transforming a plurality of vectors from a first color space to a second color space using integer arithmetic, wherein the step of forward transforming comprises generating outputs $Y_{rev}$, $U_{rev}$ and $V_{rev}$ according to the following equations:

$$Y_{rev} = \left\lfloor \frac{R + 2G + B}{4} \right\rfloor$$

$$U_{rev} = R - G$$
$$V_{rev} = B - G$$

where R, G and B comprise components in each of the plurality of vectors; and
inverse transforming the plurality of vectors in the second color space to the first color space using integer arithmetic, wherein any truncation and rounding performed during the color conversion are recovered.

43. A method for performing color conversion comprising the steps of:
forward transforming a plurality of vectors from a first color space to a second color space using integer arithmetic, wherein the steps of forward transforming comprises generating outputs $Y_{rev}$, $U_{rev}$ and $V_{rev}$ according to the following equations:

$$Y_{rev} = \left\lfloor \frac{R + 2G + B}{4} \right\rfloor$$

$$U_{rev} = \left\lfloor \frac{-R + 2G - B}{2} \right\rfloor$$

$$V_{rev} = R - B$$

where R, G and B comprise components in each of the plurality of vectors; and
inverse transforming the plurality of vectors in the second color space to the first color space using integer arithmetic, wherein any truncation and rounding performed during the color conversion are recovered.

44. A method for performing color conversion comprising the steps of:
forward transforming a plurality of vectors from a first color space to a second color space using integer arithmetic; and
inverse transforming the plurality of vectors in the second color space to the first color space using integer arithmetic, wherein any truncation and rounding performed during the color conversion are recovered, wherein the steps of inverse transforming comprises regenerating the plurality of vectors from outputs $Y_{rev}$, $U_{rev}$ and $V_{rev}$ according to the following equations:

$$G = Y_{rev} - \left\lfloor \frac{U_{rev} + V_{rev}}{4} \right\rfloor$$

$$R = U_{rev} + G$$
$$B = V_{rev} + G$$

where R, G and B comprise components in each of the plurality of vectors.

45. A system comprising:
a color conversion subsystem to reverse a reversible color conversion performed on a plurality of vectors, wherein the color conversion subsystem comprises an inverse transform to regenerate the plurality of vectors from outputs $Y_{rev}$, $U_{rev}$ and $V_{rev}$ using integer arithmetic according to the following equations:

$$G = Y_{rev} - \left\lfloor \frac{U_{rev} + V_{rev}}{4} \right\rfloor$$

$$R = U_{rev} + G$$
$$B = V_{rev} + G$$

where R, G and B comprise components of the plurality of vectors; and
at least one destination device coupled to the color conversion subsystem for manipulating the plurality of vectors after reconversion by said color conversion system.

46. A system comprising:
a color conversion subsystem to reverse a reversible color conversion performed on a plurality of vectors, wherein the color conversion subsystem comprises an inverse transform to regenerate the plurality of vectors from outputs $Y_{rev}$, $U_{rev}$ and $V_{rev}$ using integer arithmetic according to the following equations:

$$G = Y_{rev} + (U_r + x)/2$$

$$R = G - U_{rev} + \left\lfloor \frac{V_{rev}}{2} \right\rfloor$$

$$B = G - U_{rev} - \left\lfloor \frac{V_{rev} + 1}{2} \right\rfloor$$

where R, G and B comprise components of the plurality of vectors and x is a non-linear value; and
at least one destination device coupled to the color conversion subsystem for manipulating the plurality of vectors after reconversion by said color conversion system.

* * * * *

UNITED STATES PATENT AND TRADEMARK OFFICE
CERTIFICATE OF CORRECTION

PATENT NO. : 5,731,988
DATED : March 24, 1998
INVENTOR(S) : Zandi et al.

It is certified that error appears in the above-identified patent and that said Letters Patent is hereby corrected as shown below:

In the Title Page at [73] at line 1 delete "Richo Company, Ltd." and insert --Ricoh Company, Ltd.--

In the Title Page at [73] at line 2 delete "Richo Corporation" and insert --Ricoh Corporation--

Signed and Sealed this

First Day of September, 1998

Attest:

BRUCE LEHMAN

Attesting Officer

Commissioner of Patents and Trademarks